United States Patent Office 3,312,704
Patented Apr. 4, 1967

3,312,704
PROCESS FOR PREPARING O,S-DISUBSTITUTED THIOL-TYPE THIAMINE DERIVATIVES
Akira Takamizawa, Osaka, and Kentaro Hirai, Kyoto, Japan, assignors to Shionogi & Co., Ltd., Osaka, Japan
No Drawing. Filed Aug. 17, 1964, Ser. No. 390,242
Claims priority, application Japan, Aug. 19, 1963, 38/44,361
4 Claims. (Cl. 260—256.5)

The present invention relates to a process for preparing O,S-disubstituted thiol-type thiamine derivatives represented by the formula:

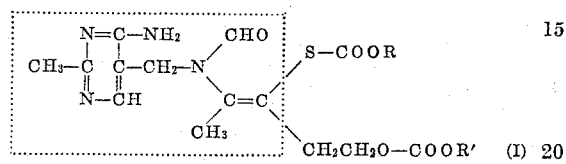

wherein R and R' are each an alkyl group having not more than five carbon atoms (e.g. methyl, ethyl, propyl, butyl) or an alkenyl group having not more than five carbon atoms (e.g. allyl, crotyl). [The partial structure encompassed by the dotted line in the above formula will be hereinafter summarized as "Thia."]

The said O,S-disubstituted thiol-type thiamine derivatives (I) and non-toxic salts thereof possess vitamin $B_1$ activity. It is noted that, when orally administered, these compounds are rapidly absorbed from the intestinal canal and a high concentration of vitamin $B_1$ in the blood is maintained for a long time.

The said O,S-disubstituted thiol-type thiamine derivatives (I) have heretofore been prepared by the following two methods:

Method A

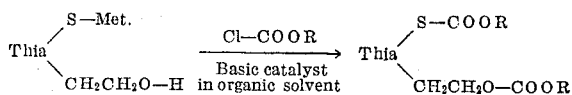

Method B

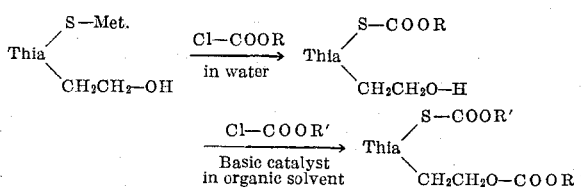

wherein Met. is an alkali metal (e.g. sodium, potassium) and R and R' have each the same significance as designated above. Of these methods, the method (B) affords the objective O,S-disubstituted thiol-type thiamine derivatives (I) in better yields than the method (A), although the former requires two steps. As well known, however, thiol-type thiamine and its derivatives are relatively unstable in a basic medium, and the use of a basic catalyst in the methods (A) and (B) results in unavoidable contamination of the product with the impurities produced by decomposition of the starting material, the intermediate and/or the product whereby somewhat difficult purification is caused.

There has now been discovered that O-(α-tetrahydropyranyl)-S-substituted thiol-type thiamine derivatives represented by the formula:

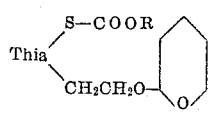

wherein R has the same significance as designated above react with phosgene in an organic solvent whereby the α-tetrahydropyranyl group at the O-position is replaced by a chlorocarbonyl group to give O-chlorocarbonyl-S-substituted thiol-type thiamine derivatives represented by the formula:

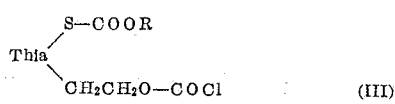

wherein R has the same significance as designated above. There has also been discovered that the thus-prepared O-chlorocarbonyl-S-substituted thiol-type thiamine derivatives (III) react with an alkanol or alkenol to give the objective O,S-disubstituted thiol-type thiamine derivatives (I). The present invention is substantially based on the discoveries.

The process of the present invention is represented by the following formulae:

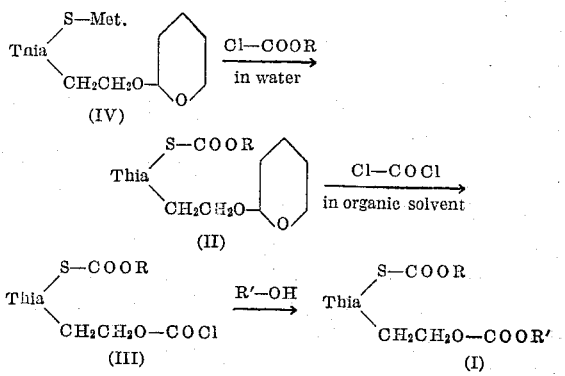

wherein R, R' and Met. have each the same significance as designated above. As understood from the above formulae, the present process requires no basic catalyst. Accordingly, the objective O,S-disubstituted thiol-type thiamine derivatives (I) can be prepared in good yields with high purity.

The starting S-alkali metal salt of O-(α-tetrahydropyranyl)-thiamine (IV) is advantageously prepared by the following process: (1) reacting 3-halogeno-5-hydroxy-2-pentanone with 4H-dihydropyran in the presence of a mineral acid; (2) reacting the resultant 3-halogeno-5-(2-tetrahydropyranyloxy)-2-pentanone with N-(2-methyl-4-amino-5-pyrimidyl)-methyldithiocarbamic acid in the presence of a base; (3) treating the resulting 3-(2-methyl-4 - amino - 5-pyrimidyl)-methyl-4-methyl-4-hydroxy-5-[2-(2 - tetrahydropyranyloxy) - ethyl]-thiazolidine-2-thione with a mineral acid in the presence of 4H-dihydropyran; (4) reacting the resultant O-(α-tetrahydropyranyl)-thiothiamine with hydrogen peroxide in the presence of barium ion at a pH between 3 and 6; and (5) treating the resulting O-(α-tetrahydropyranyl)-thiamine with an aqueous alkali hydroxide.

According to the present invention, the starting S-alkali metal salt of O-(α-tetrahydropyranyl)-thiamine (IV) is first reacted with an alkyl or alkenyl chlorocarbonate in water. The reaction may be effected at room temperature (10 to 30° C.) or while heatnig. Then, the resultant O-(α-tetrahydropyranyl)-S-substituted thiol-type thiamine derivative (II) is reacted with phosgene in an inert organic solvent (e.g. benzene, toluene, ether, tetrahydrofuran, dioxane, chloroform, bromoform, dichloromethane, dichloroethane, trichloroethane, carbon tetrachloride). The reaction can proceed automatically with generation of heat. No cooling or heating is needed. The thus-prepared O-chlorocarbonyl-S-substituted thiol-type thiamine derivative (III) is then reacted with an alkanol or alkenol. The reaction may be carried out at a temperature from room temperature to refluxing temperature. As an alkanol or alkenol can play a role of a solvent as well as a reagent, no other solvent is required. Although the present process has been hereinabove illustrated step by step, these steps may be effected successively without isolation of the intermediary products.

Presently preferred embodiments of the present invention are illustratively shown in the following examples. The relationship of parts by weight to parts by volume is the same as that between grams and milliliters. Temperatures are set forth in degrees centigrade.

*Example 1*

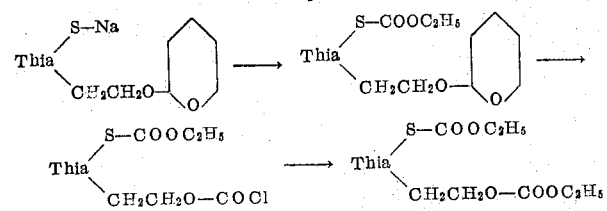

(A) To a solution of S-sodium salt of O-(α-tetrahydropyranyl)-thiamine (1.94 parts by weight) in water (20 parts by volume), there is dropwise added ethyl chlorocarbonate (0.55 part by weight) while cooling with ice, and the resultant mixture is stirred for 3 hours at room temperature (10 to 30° C.). The reaction mixture is made alkaline with ammonia and shaken with chloroform. The chloroform layer is dried over anhydrous sodium sulfate and the solvent evaporated. The residue is crystallized from ethanol to give O-(α-tetrahydropyranyl)-S-ethoxycarbonylthiamine monohydrate (2.0 parts by weight) as crystals melting at 73 to 74° C.

(B) To a solution of O-(α-tetrahydropyranyl)-S-ethoxy-carbonylthiamine monohydrate (5.0 parts by weight) in chloroform (50 parts by volume), there is dropwise added a solution of phosgene (2.7 parts by weight) in toluene (6.3 parts by weight) while stirring whereby the reaction proceeds with generation of heat. The resulting mixture is stirred at room temperature (10 to 30° C.) for 3 hours and the solvent evaporated under reduced pressure to give O-chlorocarbonyl-S-ethoxycarbonylthiamine hydrochloride (5.4 parts by weight) as a colorless resinous material

[IR: $\lambda_{max}^{CHCl_3}$ 2530 (broad), 1770, 1720 cm.$^{-1}$].

(C) O-chlorocarbonyl-S-ethoxycarbonylthiamine hydrochloride (5.4 parts by weight) is combined with anhydrous ethanol (20 parts by volume) and heated at 50° C. for 1 hour. The reaction mixture is allowed to stand overnight and concentrated under reduced pressure. The residue is dissolved in chloroform (150 parts by volume) and shaken with 15% hydrochloric acid (30 parts by volume). The chloroform layer is dried over anhydrous magnesium sulfate and the solvent evaporated. The residue is crystallized from ether and recrystallized from acetone to give O,S-diethoxycarbonylthiamine hydrochloride monohydrate (4.7 parts by weight) as crystals melting at 121° C. (decomp.).

*Example 2*

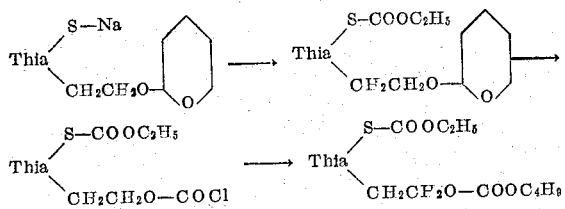

In the same manner as shown in Example 1 (A), (B) and (C), S-sodium salt of O-(α-tetrahydropyranyl)-thiamine is converted into O-n-butoxycarbonyl-S-ethoxycarbonylthiamine hydrochloride monohydrate [M.P. 105 to 106° C. (decomp.)] through O-(α-tetrahydropyranyl)-S-ethoxycarbonylthiamine monohydrate and O-chlorocarbonyl-S-ethoxycarbonylthiamine hydrochloride.

*Example 3*

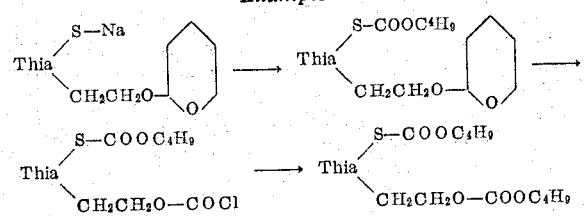

In the same manner as shown in Example 1 (A), (B) and (C), S-sodium salt of O-(α-tetrahydropyranyl)-thiamine is converted into O,S-di-n-butoxycarbonylthiamine hydrochloride monohydrate [M.P. 85 to 88° C.] through O-(α-tetrahydropyranyl)-S-n-butoxycarbonylthiamine hydrochloride [M.P. 125° C.] and O-chlorocarbonyl-S-n-butoxycarbonylthiamine hydrochloride.

*Example 4*

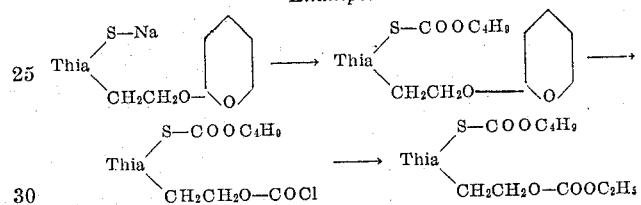

In the same manner as shown in Example 1 (A), (B) and (C), S-sodium salt of O-(α-tetrahydropyranyl)-thiamine is converted into O-ethoxycarbonyl-S-n-butoxycarbonylthiamine hydrochloride semihydrate [M.P. 136° C. (decomp.)] through O-(α-tetrahydropyranyl)-S-n-butoxycarbonylthiamine hydrochloride and O-chlorocarbonyl-S-n-butoxycarbonylthiamine hydrochloride.

*Example 5*

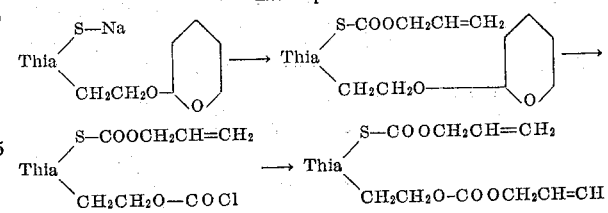

(A) To a solution of S-sodium salt of O-(α-tetrahydropyranyl)-thiamine (1.94 parts by weight) in water (20 parts by volume), there is dropwise added allyl chlorocarbonate (0.61 part by weight) while cooling with ice, and the resultant mixture is stirred for 3 hours at room temperature (10 to 30° C.). The reaction mixture is made alkaline with ammonia and shaken with chloroform. The chloroform layer is dried over anhydrous sodium sulfate and the solvent evaporated. The residue is crystallized from hydrous ethanol to give O-(α-tetrahydropyranyl) - S - allyloxycarbonylthiamine monohydrate (1.9 parts by weight) as crystals melting at 61 to 63° C. (decomp.).

(B) To a solution of O-(α-tetrahydropyranyl)-S-allyloxycarbonylthiamine monohydrate (4.5 parts by weight) in chloroform (50 parts by volume), there is dropwise added a solution of phosgene (2.7 parts by weight) in toluene (6.3 parts by weight) while stirring whereby the reaction proceeds with generation of heat. The resulting mixture is stirred at room temperature (10 to 30° C.) for 3 hours and the solvent evaporated to give O-chlorocarbonyl - S - allyloxycarbonylthiamine hydrochloride (5.2 parts by weight) as a colorless resinous material.

(C) O-Chlorocarbonyl-S-allyloxycarbonylthiamine hydrochloride (5.2 parts by weight) is combined with allyl alcohol (20 parts by volume), heated at 50° C. for 1 hour and allowed to stand overnight. The reaction mixture is concentrated under reduced pressure. The residue is dissolved in chloroform and shaken with 10% hydrochloric acid. The chloroform layer is dried over anhydrous magnesium sulfate and the solvent evaporated. The residue is crystallized from acetone to give O,S-diallyloxycarbonylthiamine hydrochloride (4.25 parts by weight) as crystals melting at 125 to 126° C. (decomp.).

What is claimed is:

1. Process for preparing O,S-disubstituted thioltype thiamine derivatives which comprises reacting S-alkali metal salt of O-(α-tetrahydropyranyl)-thiamine of the formula:

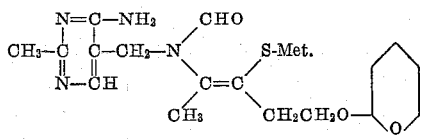

wherein Met. is an alkali metal with a member selected from the group consisting of alkyl chlorocarbonate and alkenyl chlorocarbonate in water, reacting the resultant O-(α-tetrahydropyranyl) - S - substituted thiol - type thiamine derivative of the formula:

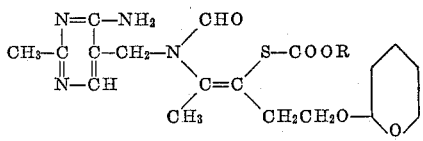

wherein R is a member selected from the group consisting of alkyl having not more than five carbon atoms and alkenyl having not more than five carbon atoms with phosgene in an inert organic solvent and reacting the resulting O-chlorocarbonyl - S - substituted thiol-type thiamine derivative of the formula:

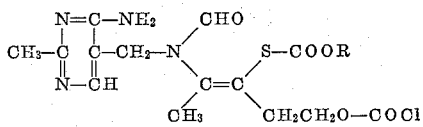

wherein R has the same significance as designated above with a member selected from the group consisting of alkanol and alkenol to give the O,S-disubstituted thioltype thiamine derivative of the formula:

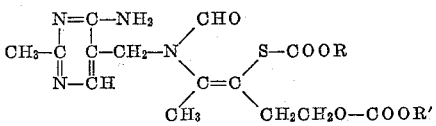

wherein R' is a member selected from the group consisting of alkyl having not more than five carbon atoms and alkenyl having not more than five carbon atoms and R has the same significance as designated above.

2. Process for preparing O,S-diethoxycarbonylthiamine which comprises reacting S-sodium salt of O-(α-tetrahydropyranyl)-thiamine with ethyl chlorocarbonate in water, reacting the resultant O-(α-tetrahydropyranyl)-S-ethoxycarbonylthiamine with phosgene in an inert organic solvent and reacting the resulting O-chlorocarbonyl-S-ethoxycarbonylthiamine with ethanol.

3. Process for preparing O,S-diallyloxycarbonylthiamine which comprises reacting S-sodium salt of O-(α-tetrahydropyranyl)-thiamine with allyl chlorocarbonate in water, reacting the resultant O-(α-tetrahydropyranyl)-S-allyloxycarbonylthiamine with phosgene in an inert organic solvent and reacting the resulting O-chlorocarbonyl-S-allyloxycarbonylthiamine with allyl alcohol.

4. A method for replacing the pyranyl group in a compound of the formula

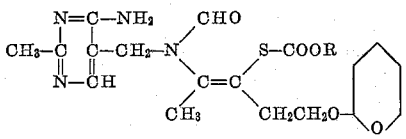

by a —COOR group, which comprises reacting the latter with phosgene in inert solvent medium, whereby the

group is replaced by —COCl, and reacting the resultant compound with a member selected from the group consisting of lower alkanol and lower alkenol, R being selected from the group consisting of lower alkyl and lower alkenyl.

References Cited by the Examiner

UNITED STATES PATENTS 3,158,613  11/1964  Takamizawa et al. __ 260—256.5

FOREIGN PATENTS 944,641  12/1963  Great Britain.

OTHER REFERENCES

Yoshida: The Annual Report of Takamine Laboratory, vol. 13, 1961, pages 12–13.

ALEX MAZEL, *Primary Examiner.*

MARY U. O'BRIEN, *Assistant Examiner.*